US 7,021,407 B2

(12) United States Patent
Ruschke et al.

(10) Patent No.: US 7,021,407 B2
(45) Date of Patent: Apr. 4, 2006

(54) MOTORIZED PROPULSION SYSTEM FOR A BED

(75) Inventors: Jeffrey A. Ruschke, Lawrenceburg, IN (US); Thomas W. Hanson, Loveland, OH (US)

(73) Assignee: Hill-Rom Services, Inc., Wilmington, DE (US)

( * ) Notice: Subject to any disclaimer, the term of this patent is extended or adjusted under 35 U.S.C. 154(b) by 0 days.

(21) Appl. No.: 09/853,802

(22) Filed: May 11, 2001

(65) Prior Publication Data

US 2002/0084116 A1 Jul. 4, 2002

Related U.S. Application Data

(60) Provisional application No. 60/203,401, filed on May 11, 2000, provisional application No. 60/218,612, filed on Jul. 17, 2000.

(51) Int. Cl.
*B62D 51/04* (2006.01)
(52) U.S. Cl. ........................... 180/11; 180/19.1
(58) Field of Classification Search ............ 180/11–13, 180/15, 16, 19.1
See application file for complete search history.

(56) References Cited

U.S. PATENT DOCUMENTS

| 813,213 | A | 2/1906 | Johnson |
|---|---|---|---|
| 1,598,124 | A | 8/1926 | Evans |
| 2,635,899 | A | 4/1953 | Osbon, Jr. |
| 2,999,555 | A | 9/1961 | Stroud et al. |
| 3,004,768 | A | 10/1961 | Klages |
| 3,112,001 | A | 11/1963 | Wise |
| 3,380,546 | A | 4/1968 | Rabjohn |
| 3,452,371 | A | 7/1969 | Hirsch |
| 3,770,070 | A | 11/1973 | Smith |
| 3,814,199 | A | 6/1974 | Jones |
| 3,876,024 | A | 4/1975 | Shieman et al. |
| 3,929,354 | A | 12/1975 | Elkins |
| 4,415,049 | A | 11/1983 | Wereb |
| 4,475,613 | A | 10/1984 | Walker |
| 4,513,832 | A | 4/1985 | Engman |
| 4,566,707 | A | 1/1986 | Nitzberg |
| 4,584,989 | A | 4/1986 | Stith |
| 4,759,418 | A | 7/1988 | Goldenfeld et al. |
| 4,771,840 | A | 9/1988 | Keller |
| 4,807,716 | A | 2/1989 | Hawkins |
| 4,811,988 | A | 3/1989 | Immel |
| 4,949,408 | A | 8/1990 | Trkla |
| 5,083,625 | A | 1/1992 | Bleicher |
| 5,094,314 | A | 3/1992 | Hayata |

(Continued)

FOREIGN PATENT DOCUMENTS

CA        2010543        9/1990

(Continued)

OTHER PUBLICATIONS

"Motorvations Equipment Cart Mover (MV3C), uLTRA-SOUND mOVER," http://www.motorvator3.com/equip-cartmoverr.htm. May 10, 2000.

(Continued)

*Primary Examiner*—Lesley D. Morris
*Assistant Examiner*—Matthew Luby
(74) *Attorney, Agent, or Firm*—Bose McKinney & Evans LLP

(57) ABSTRACT

According to the present disclosure, a propulsion system is provided to assist a caregiver in moving a patient support about a care facility. The propulsion system is detachably coupled to patient support to permit storage of the propulsion system or use of propulsion system on multiple patient supports.

7 Claims, 12 Drawing Sheets

U.S. PATENT DOCUMENTS

| | | |
|---|---|---|
| 5,117,521 A | 6/1992 | Foster et al. |
| 5,121,806 A | 6/1992 | Johnson |
| 5,156,226 A | 10/1992 | Boyer et al. |
| 5,201,819 A | 4/1993 | Shiraishi et al. |
| 5,222,567 A | 6/1993 | Broadhead et al. |
| 5,322,306 A | 6/1994 | Coleman |
| 5,337,845 A | 8/1994 | Foster et al. |
| 5,366,036 A | 11/1994 | Perry |
| 5,439,069 A | 8/1995 | Beeler |
| 5,445,233 A | 8/1995 | Fernie et al. |
| 5,477,935 A | 12/1995 | Chen |
| 5,495,904 A | 3/1996 | Zwaan et al. |
| 5,526,890 A | 6/1996 | Kadowaki |
| 5,535,465 A | 7/1996 | Hannant |
| 5,580,207 A | 12/1996 | Kiebooms et al. |
| 5,839,528 A | 11/1998 | Lee |
| 5,934,694 A | 8/1999 | Schugt et al. |
| 5,988,304 A | 11/1999 | Behrendts |
| 6,059,060 A | 5/2000 | Kanno et al. |
| 6,062,328 A | 5/2000 | Campbell et al. |
| 6,065,555 A | 5/2000 | Yuki et al. |
| 6,070,679 A | 6/2000 | Berg et al. |
| 6,073,285 A | 6/2000 | Ambach et al. |
| 6,148,942 A | 11/2000 | Mackert, Sr. |
| 6,178,575 B1 * | 1/2001 | Harada ........................ 180/11 |

FOREIGN PATENT DOCUMENTS

| | | |
|---|---|---|
| DE | 1 041 210 | 10/1958 |
| DE | G 94 20 429.2 | 3/1995 |
| DE | 199 21 503 A1 | 4/2000 |
| EP | 0 093 700 A2 | 11/1983 |
| EP | 0 204 637 | 4/1986 |
| EP | 0 420 263 A1 | 4/1991 |
| FR | 2 735 019 A1 | 12/1996 |
| FR | 2 746 060 | 9/1997 |
| GB | 1 601 930 | 11/1981 |
| GB | 2 285 393 A | 7/1995 |
| JP | 46-31490 | 9/1971 |
| JP | 47-814 | 8/1972 |
| JP | 47-17495 | 10/1972 |
| JP | 48-44792 | 6/1973 |
| JP | 48-44793 | 6/1973 |
| JP | 48-54494 | 7/1973 |
| JP | 49-29855 | 8/1974 |
| JP | 53-9091 | 1/1978 |
| JP | 57-187521 | 11/1982 |
| JP | 58-63575 | 4/1983 |
| JP | 59-38176 | 3/1984 |
| JP | 60-122561 | 7/1985 |
| JP | 2-84961 A | 3/1990 |
| JP | 6-50631 | 7/1994 |
| JP | 8-317953 A | 12/1996 |
| JP | 9-24071 | 1/1997 |
| JP | 9-38154 A | 2/1997 |
| JP | 9-38155 A | 2/1997 |
| JP | 10-146364 A | 8/1998 |
| WO | 94/16935 | 8/1994 |
| WO | WO 01/19313 A1 | 3/2001 |

OTHER PUBLICATIONS

"Stryker Medical 2040 (Zoom) Critical Care Bed, Maintenance Manual," 2040 ICU Bed 2040-100-2 REV_; Stryker Medical, date unknown.

"Stryker Medical 2040 (Zoom) Drive, Revolutionary, Self-propelled, Patent Transport," Kalamazoo, MI; Mar. 2000.

* cited by examiner

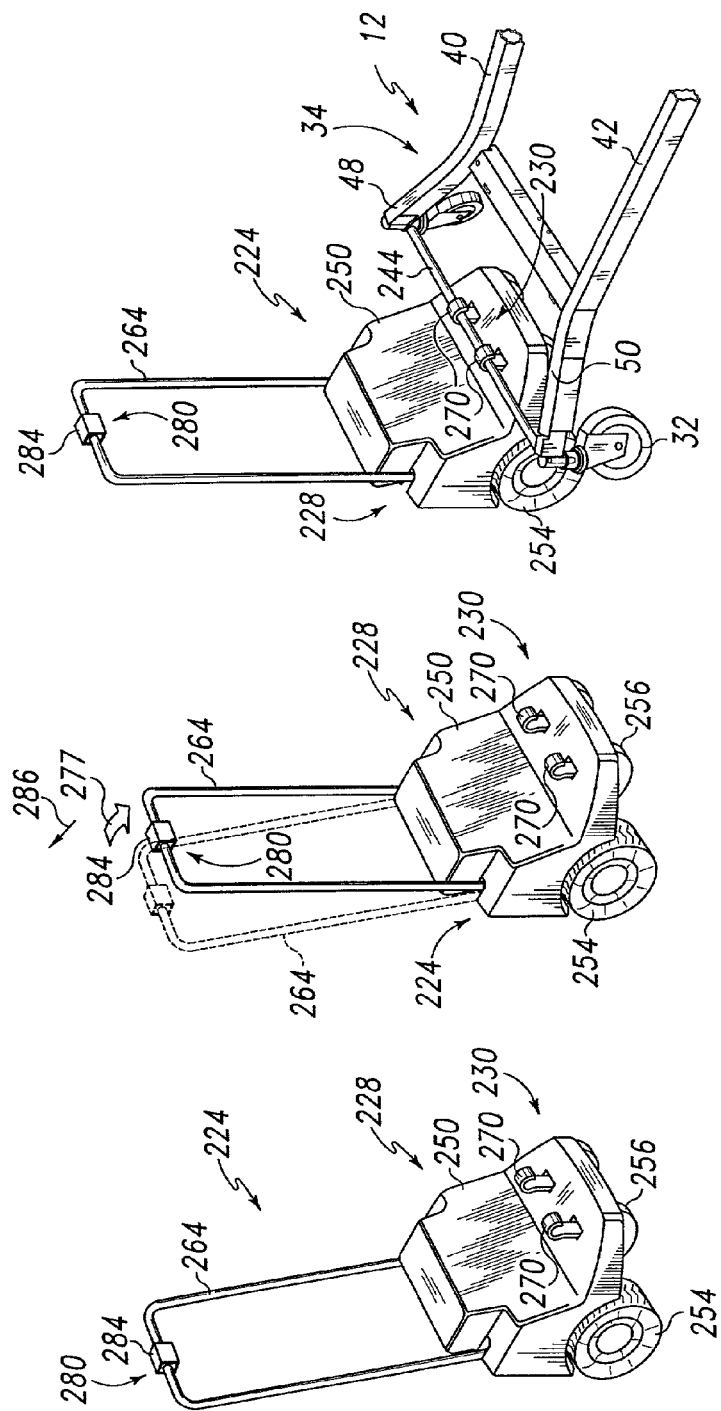

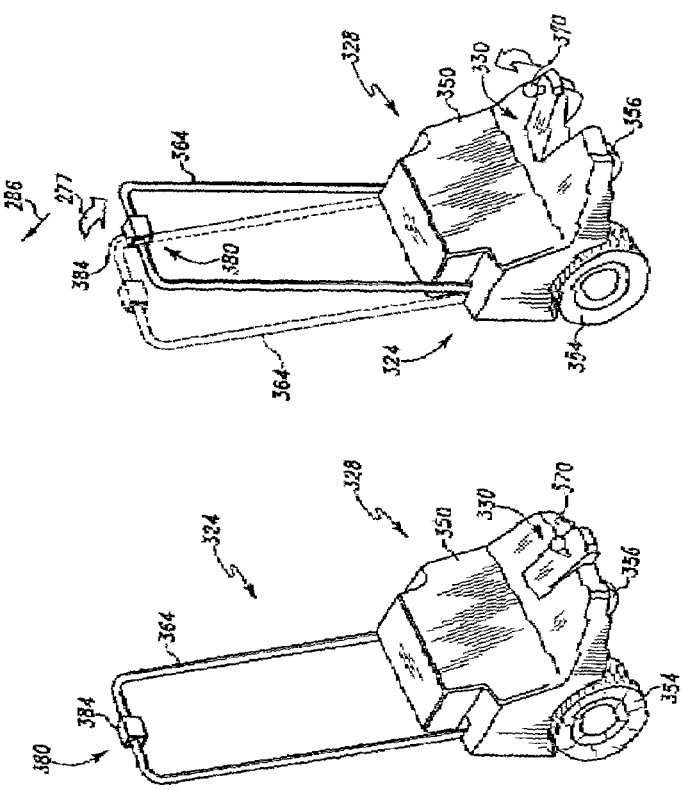
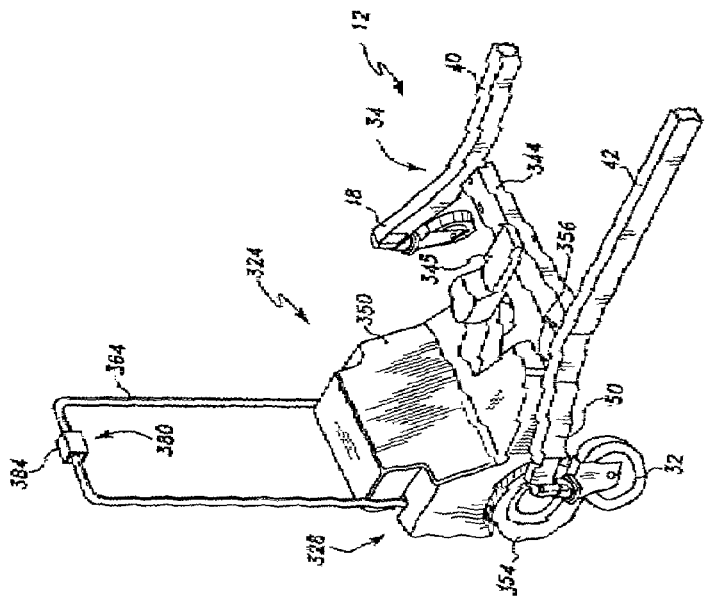
Fig. 14
Fig. 13
Fig. 12

MOTORIZED PROPULSION SYSTEM FOR A BED

BACKGROUND OF THE INVENTION

This application claims benefit of U.S. Provisional Application Ser. No. 60/203,401, filed May 11, 2000, titled Motorized Propulsion System, and U.S. Provisional Application Ser. No. 60/218,612, filed Jul. 17, 2000, titled Motorized Propulsion System, the disclosures of which are expressly incorporated by reference herein. The disclosure of U.S. patent application Ser. No. 09/853,221, filed herewith, titled Motorized Traction Device for A Patient Support, to Hanson et al. is expressly incorporated by reference herein.

This invention relates to patient supports, such as beds. More particularly, the present invention relates to devices for moving a patient support to assist caregivers in moving the patient support from one location in a care facility to another location in the care facility.

According to the present invention, a patient support apparatus is provided that is configured to support a patient. The patient support system includes a patient support including a bedframe and a mattress supported by the bedframe and a propulsion system. The propulsion system includes a propulsion device configured to contact the floor to power movement of the patient support and a coupler configured to pivotably and detachably couple the propulsion device to the bedframe of the patient support.

According to another embodiment of the present invention, a propulsion system is provided that is configured to move a patient support. The propulsion system includes a propulsion device adapted to contact the floor to power movement of the patient support and a coupler configured to detachably couple the propulsion device to the patient support. The coupler includes a first member adapted to couple the patient support at first distance from the floor and a second member adapted to couple the patient support at a second distance from the floor that is greater than the first distance.

According to another aspect of the present invention, a propulsion system is provided that is configured to move a patient support having a patient restraint board. The propulsion system includes a propulsion device configured to contact the floor to power movement of the patient support and a coupler configured to couple the propulsion device to the patient support. The coupler is adapted to be coupled to the patient restraint board.

According to another embodiment of the present invention, a propulsion system is provided that is configured to move a patient support having a bedframe and mattress supported by the bedframe. The propulsion system includes a propulsion device adapted to contact the floor to power movement of the patient support, a coupler configured to move between a coupled position coupling the propulsion device to the bedframe and an uncoupled device permitting movement of the propulsion device away from the bedframe, and a vertically extending handle coupled to the coupler and configured to move the coupler between the coupled and uncoupled positions.

Additional features of the disclosure will become apparent to those skilled in the art upon consideration of the following detailed description when taken in conjunction with the accompanying drawings.

BRIEF DESCRIPTION OF THE DRAWINGS

A detailed description particularly refers to the accompanying figures in which:

FIG. 6 is a perspective view of the motorized propulsion system of FIG. 5 showing the motorized propulsion system including a housing, a handle in a titled position, a plurality of wheels, and a pair of hooks in a raised position;

FIG. 7 is a view similar to FIG. 6 showing the handle moved forward to a substantially vertical position causing the pair hooks to move downwardly to a lowered position;

FIG. 8 is a view similar to FIG. 6 showing a portion of the bedframe including a strut and the pair of hooks coupled to the strut after being moved to the lowered position;

FIG. 12 is a perspective view of the motorized propulsion system of FIG. 11 showing the motorized propulsion system including a housing, a handle in a tilted position, a plurality of wheels, and a ball in a lowered position;

FIG. 13 is a view similar to FIG. 12 showing the handle moved forward to a substantially vertical position causing the ball to move upwardly to a raised position;

FIG. 14 is a view similar to FIG. 12 showing a portion of the bedframe including a strut and a socket coupled to the strut and the ball being positioned in the socket after being moved to the raised position;

DETAILED DESCRIPTION OF THE DRAWINGS

Figure 1:
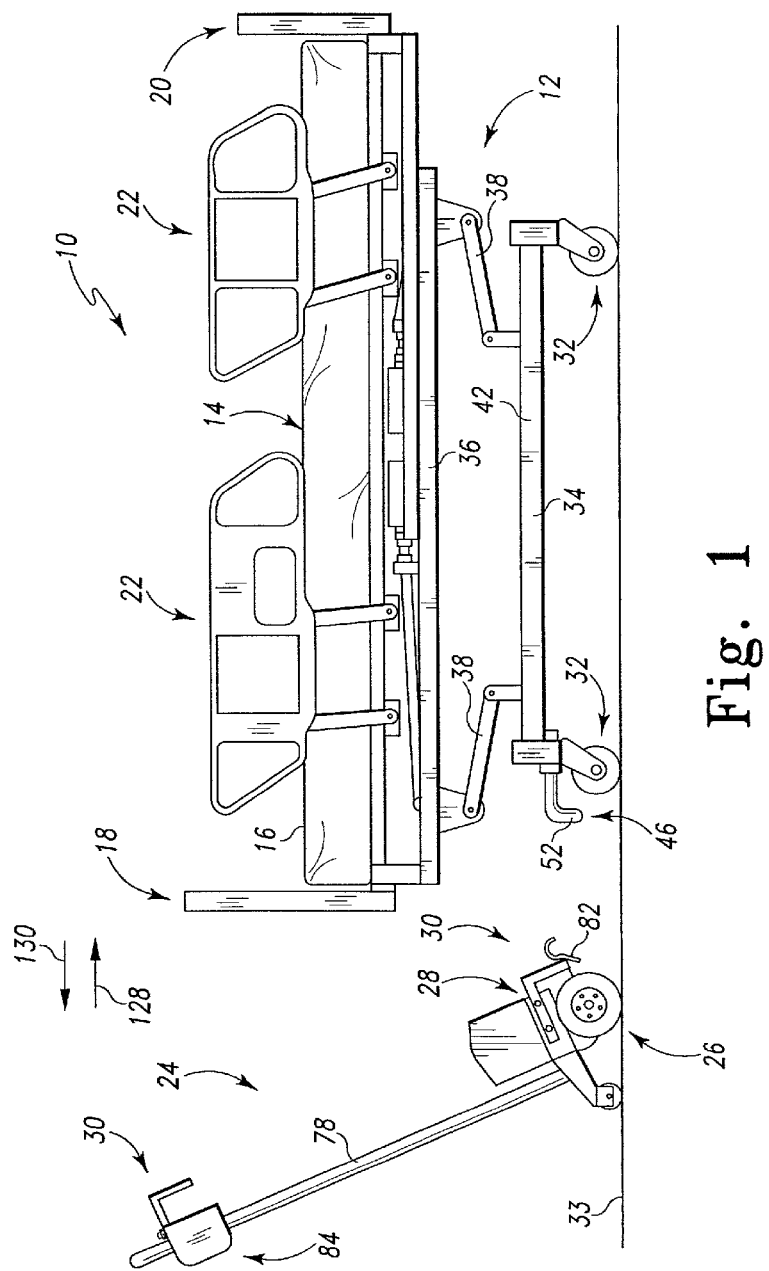
FIG. 1 is a side elevation view of a preferred embodiment bed and a motorized propulsion system spaced apart from the bed showing the bed including a bedframe, a headboard coupled to the bedframe, a footboard coupled to the bedframe, and a pair of siderails coupled to the bedframe.
Figure 3:
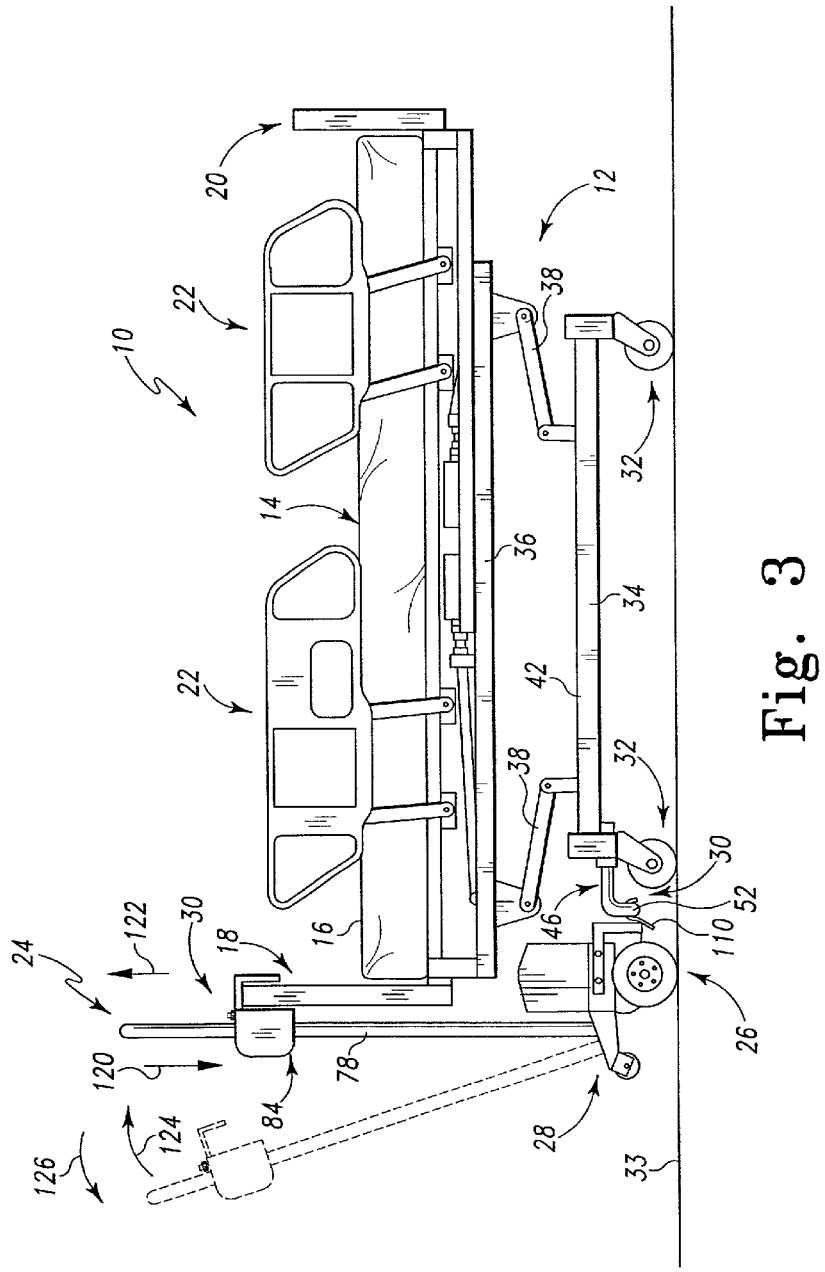
FIG. 3 is a view similar to FIG. 1 showing the motorized propulsion system coupled to the headboard and the lower portion of the bedframe.
Figure 4:
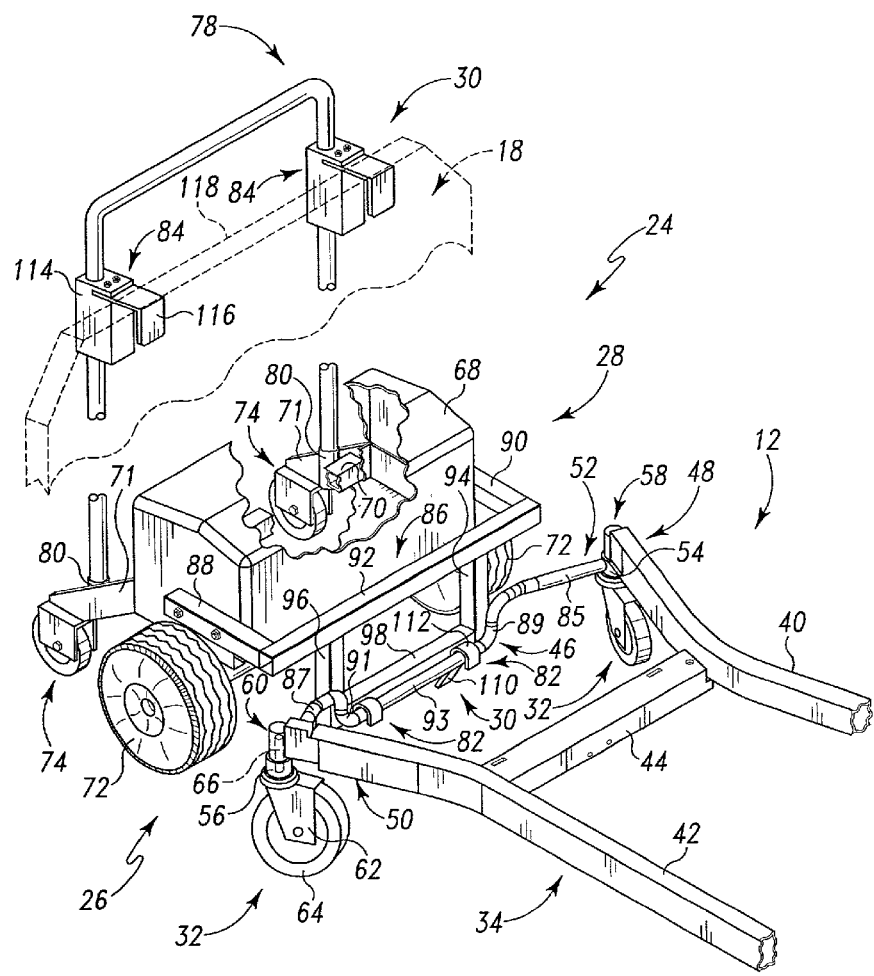
FIG. 4 is a perspective view of the a portion of the bedframe and headboard (in phantom) and the motorized propulsion system of FIG. 1 showing the motorized propulsion system, with portion broken away, coupled to the bedframe and headboard.

A patient support or bed 10 in accordance with a preferred embodiment of the present disclosure is shown in FIG. 1. Bed 10 includes a bedframe 12, a mattress 14 positioned on bedframe 12 to define a patient rest surface 16, a first patient restraint board or headboard 18 coupled to bedframe 12, a second patient restraint board or footboard 20 coupled to bedframe 12, and a pair of third patient restraint boards or siderails 22 coupled to bedframe 12. A preferred embodiment propulsion system 24 is provided that couples to bedframe 12 and headboard 18, as shown in FIGS. 3 and 4. Propulsion system 24 is provided to assist a caregiver in moving bed 10 between various rooms or locations in a care facility. According to the presently preferred embodiment, propulsion system 24 includes a propulsion device 26, a frame 28, and a coupling device or coupler 30 configured to couple frame 28 to headboard 18 and bedframe 12 so that a caregiver can couple and uncouple propulsion system 24 to bed 10.

Bed 10 includes a plurality of casters 32 that are normally in contact with floor 33. A caregiver may move bed 10 by pushing on bedframe 12 so that casters 32 move along floor 33. When it is desirable to move bed 10 a substantial distance, propulsion system 24 is coupled to bed 10 to power bed 10 so that a caregiver does not need to provide all the force and energy necessary to move bed 10 between positions in the care facility.

As shown in FIG. 1, bedframe 12 includes a base frame 34 to which casters 32 are coupled, an intermediate frame 36 to which headboard 18, footboard 20, and siderails 22 are coupled, and lift arms 38 supporting intermediate frame 36 above base frame 34 so that intermediate frame 36 may be raised and lowered. A description of a suitable mechanism for raising and lowering the intermediate frame is provided in U.S. Pat. No. 4,559,655 to Peck filed Aug. 11, 1982, the disclosure of which is expressly incorporated by reference herein.

As shown in FIG. 4, base frame 34 includes a first longitudinal member 40, a second longitudinal member 42, and a strut 44 coupled to and extending between first and second longitudinal members 40, 42. Ends 48, 50 of first and second longitudinal members 40, 42 include sockets 58, 60.

Bedframe 12 further includes an attachment strut 46 extending between ends 48, 50 of respective first and second longitudinal members 40, 42. Attachment strut 46 includes a notched bar 52 and a pair of collars 54, 56 attached to ends of notched bar 52. Collars 54, 56 are sized to fit around lower ends of sockets 58, 60. Notched bar 52 includes a pair of horizontal portions 85, 87, a pair of downwardly extending portions 89, 91, and a horizontal or hooked portion 93.

As shown in FIG. 4, each caster 32 includes a bracket 62, a wheel 64 rotatably coupled to bracket 62, and a stem 66. Stem 66 extends up through respective collars 54, 56 of attachment strut 46 and sockets 58, 60 of base frame 34 so that collars 54, 56 are positioned around the lower ends of sockets 58, 60 and rest on brackets 62 of casters 32. Thus, to couple attachment strut 46 to first and second longitudinal members 40, 42, casters 32 are removed from bedframe 12, collars 54, 56 of attachment strut 46 are positioned around the lower ends of sockets 58, 60, and stems 66 are repositioned in sockets 58, 60. Thus, bed 10 can be retrofitted with attachment strut 46 so that propulsion system 24 can be used to move bed 10 about a care facility. According to alternative embodiments, the attachment bar is bolted, welded, or otherwise coupled to the base frame.

As shown in FIG. 4, frame 28 of propulsion system 24 includes a housing 68, a frame member 70 coupled to housing 68, and a pair of brackets 71 coupled to frame member 70 and housing 68. Frame 28 further includes a handle 78 positioned in a pair of sockets 80 coupled to brackets 71 as shown in FIG. 4.

Propulsion device 24 includes a motor (not shown) positioned in housing 68, a motor controller (not shown), and a pair of drive wheels 72 coupled to frame 28 and the motor that provide the force and energy necessary to move bed 10 about the care facility. Propulsion system 24 further includes a pair of secondary wheels 74 coupled to brackets 71. According to alternative embodiments of the present disclosure, the motor controller may be fixed controller coupled to the handle, a hand-held pendant having control knobs, buttons, or switches, a joy stick, or any other suitable controller for controlling the speed and/or direction of the motor.

Coupling device 30 includes a first pair of hooks 82 configured to couple to attachment strut 46 as shown in FIGS. 3 and 4 and a second pair of hooks 84 coupled to handle 78 that are configured to couple to headboard 18 as shown in FIGS. 3 and 4. First pair of hooks 82 are coupled to housing 68 by a truss 86 as shown in FIG. 4. Truss 86 includes first and second horizontal members 88, 90 bolted or otherwise fastened to housing 68, a third horizontal member 92 extending between first and second horizontal members 88, 90, first and second vertical members 94, 96 extending down from third horizontal member 92, and a fourth horizontal member 98 extending between first and second vertical members 94, 96.

First pair of hooks 82 include a flat portion 110 welded or otherwise coupled to fourth horizontal member 98 and a curved portion 112 coupled to flat portion 110 that is configured to hook over hooked portion 93 of notched bar 52. As shown in FIG. 4, second pair of hooks 84 each include a base 114 slidably coupled to handle 78 and a hook member 116 coupled to base 114 and configured to hook over an upper edge 118 of headboard 18.

Figure 2:
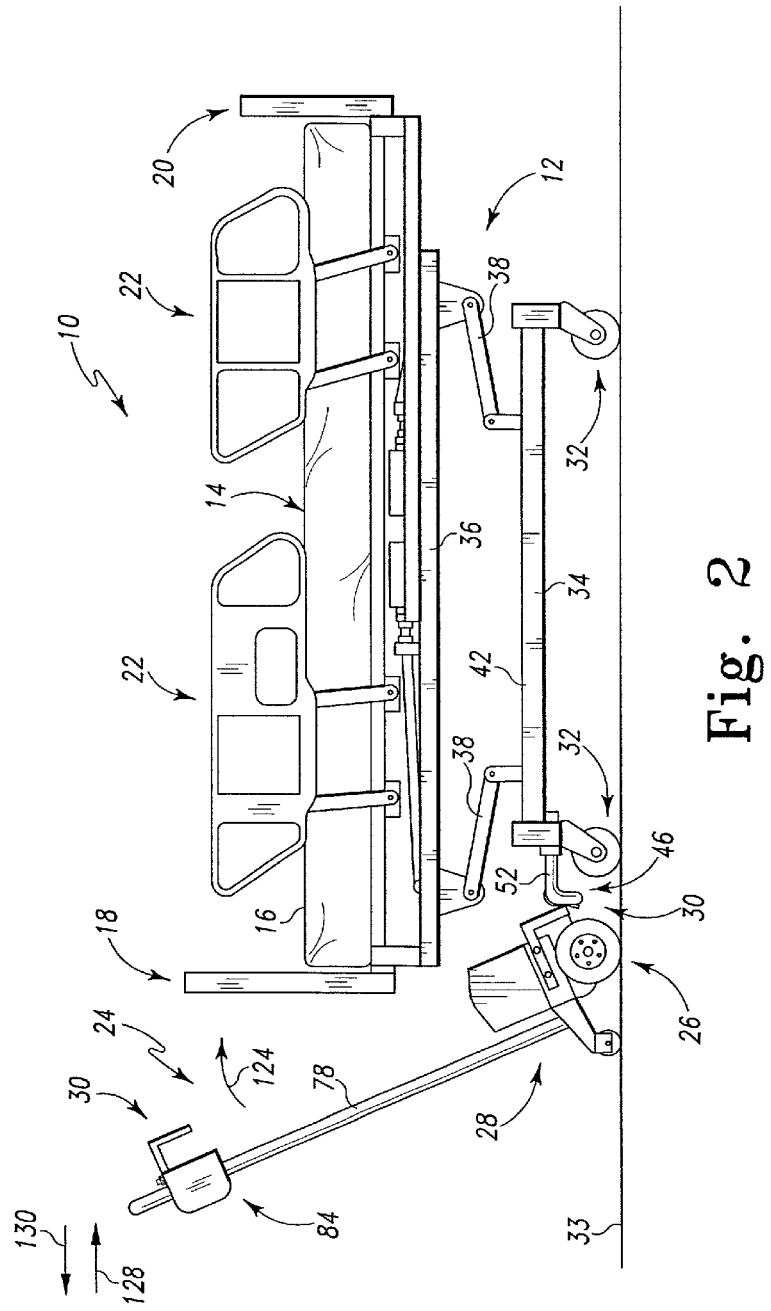
FIG. 2 is a view similar to FIG. 1 showing the motorized propulsion system positioned for coupling a lower portion of to the bedframe and headboard.

When propulsion system 24 is not coupled to bed 10 and handle 78 is in a tilted position, as shown in FIG. 1, propulsion system 24 is moved about a care facility from one bed to another by rolling on drive wheels 72 and secondary wheels 74. When a caregiver desires to move bed 10 between positions in a care facility, propulsion system 24 is coupled to bed 10. To couple propulsion system 24 to bed 10, propulsion system 24 is positioned in front of the head end of bed 10 as shown in FIG. 1. While handle 78 is in the tilted position, propulsion system 24 is rolled in direction 128 toward the head end of bed 10 so that flat portions 110 of first pair of hooks 82 contact notched bar 52 as shown in FIG. 2. Next, handle 78 is pushed forward in direction 124 to a substantially vertical position, as shown in FIG. 3, and base 114 of second pair of hooks 84 is slid down handle 78 in direction 120 until hook members 116 are positioned over upper edge 118 of headboard 18.

During rotation of handle 78, secondary wheels 74 are lifted from floor 33 as shown in FIG. 3. Second pair of hooks 84 maintain handle 78 and the remainder of propulsion system 24 in this position during use of propulsion system 24 to move bed 10 about the care facility.

To remove propulsion system 24 from bed 10, base 114 of second hooks 84 are slid upwardly in direction 122 so that hook members 116 no longer hook upper edge 118 so that handle 78 can be moved in direction 126 away from headboard 18 to the tilted position. Continued movement of handle 78 in direction 126 engages secondary wheels 74 with floor 33 to provide a pivot point to lift hooks 82 off of notched bar 52. Then, propulsion system 24 is pulled in direction 130 away from bed 10 as shown in FIGS. 1 and 2. Propulsion device 24 can then be moved to another bed that needs to be moved or propulsion device 24 may be placed in storage.

According to the present disclosure, propulsion system 24 is used with a variety of bedframe configurations. An attachment strut for each of said bedframe configurations is provided onto which hooks 82 may be coupled. Each of said attachment struts is coupled to the base frame or other component of the bed in a position so that propulsion system 24 is aligned in such a position that secondary hooks 84 are aligned to couple over the upper edge of the headboard of the respective bed.

For example, on a bedframe where the headboard is longitudinally displaced further from the caster wheels, the attachment bar is configured to move the hooked portion of the attachment bar longitudinally further from the caster wheels so that second pair of hooks on the handle are positionable over the upper edge of said headboard. Thus, propulsion system 24 is configured to be used with any number of bedframe configurations so that propulsion system 24 is a universal device for use with many different beds. According to alternative embodiments of the present disclosure, the propulsion system is configured to be coupled to the footboard of the bed, the lower edge of the headboard or footboard, or other components of the bedframe such as the intermediate frame.

Figure 5:
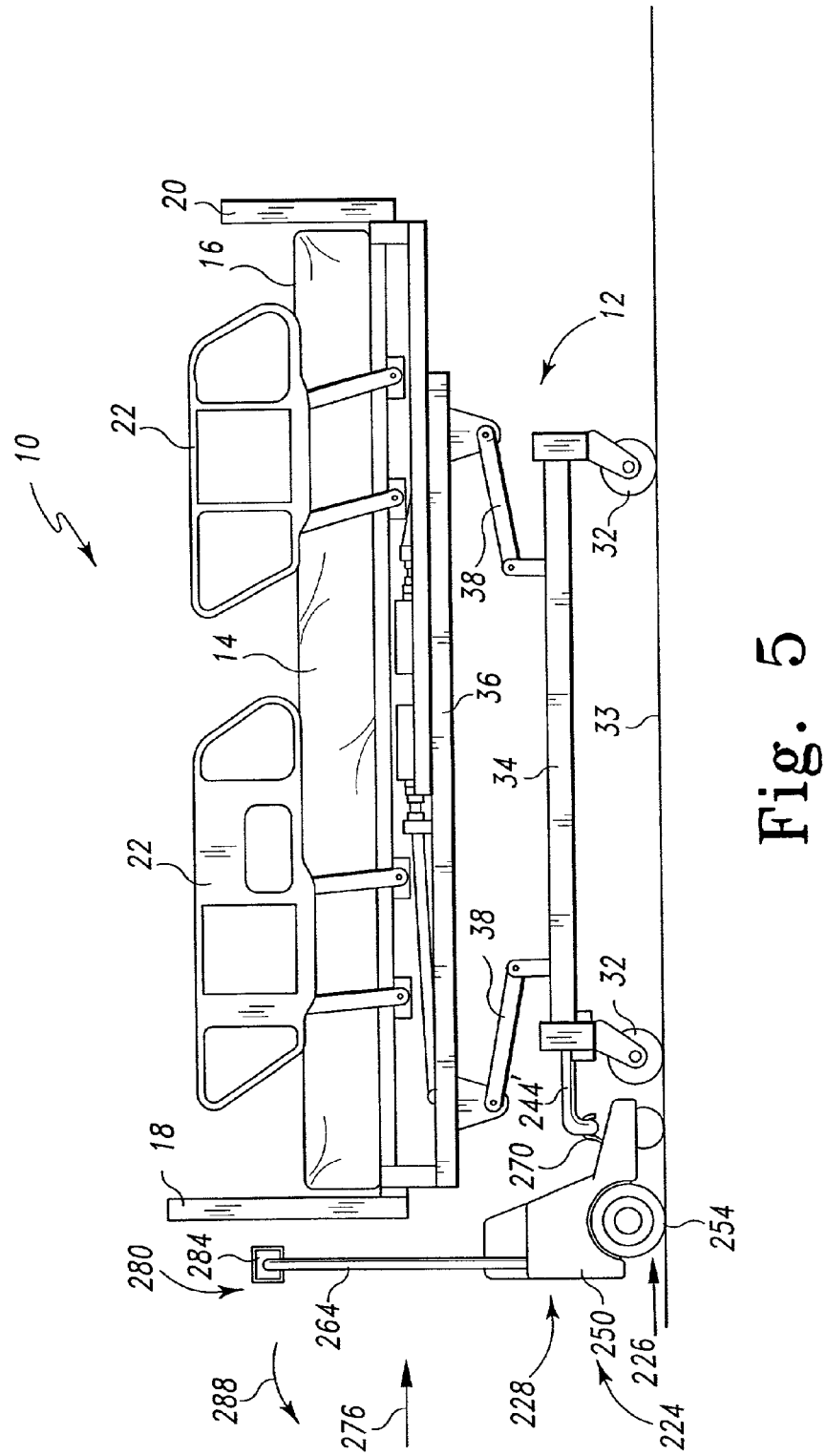
FIG. 5 is a side elevation view of the preferred embodiment bed and another motorized propulsion system coupled to the bed.
Figure 9:
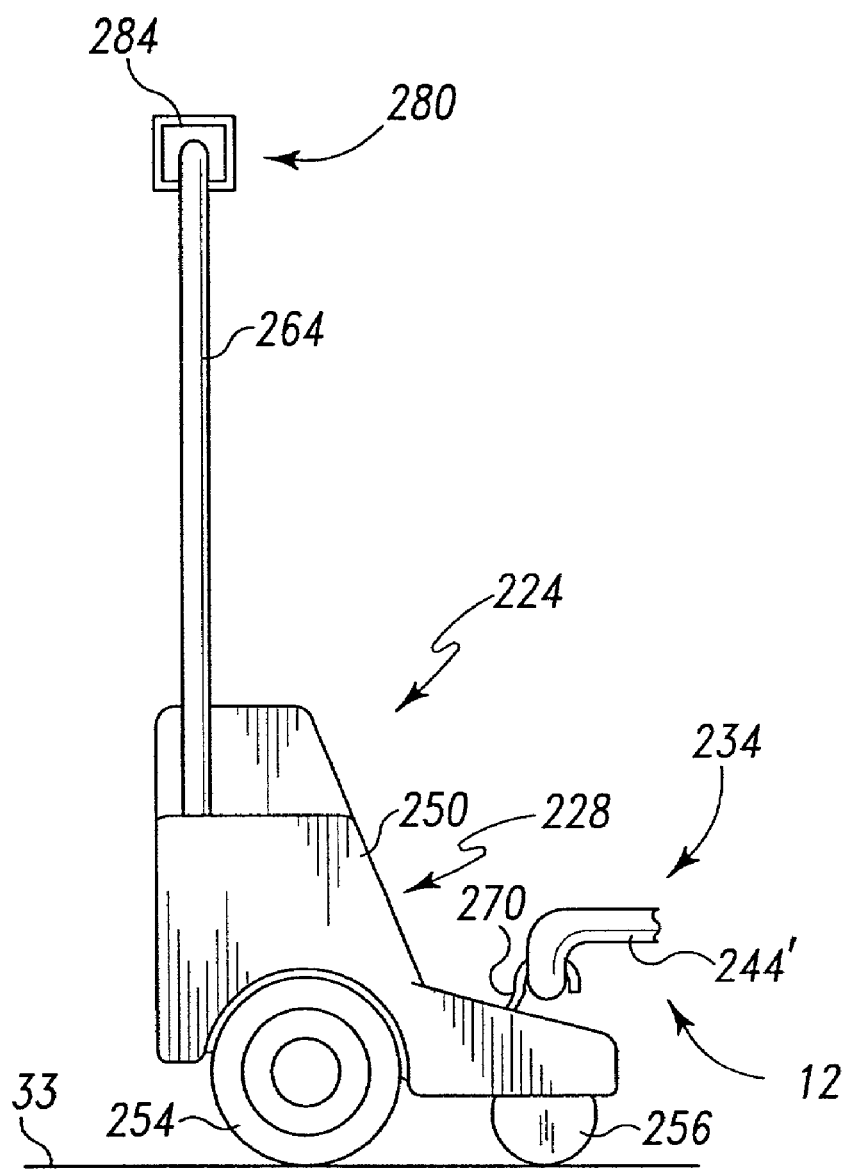
FIG. 9 is a view similar to FIG. 5, with portion of the bed broken away, showing one of the hooks moved to the lowered position coupled to the strut of the bedframe.

An alternative embodiment motorized propulsion system 224 is provided that couples to bedframe 10, as shown in FIGS. 5, 8, and 9. Propulsion system 224 is provided to assist a caregiver in moving bed 10 between various rooms or locations in a care facility. Propulsion system 224 includes a propulsion device 226, a frame 228, and a coupling device or coupler 230 configured to couple the remainder of propulsion system 224 to bedframe 10 so that a caregiver can couple and uncouple propulsion system 224 to bed 10.

When it is desirable to move bed 10 a substantial distance, propulsion system 224 is coupled to bed 10 to power bed 10 so that a caregiver does not need to provide all the force and energy necessary to move bed 10 between positions in the care facility.

As shown in FIG. 8, base frame 34 includes an attachment strut 244 extending between ends 48, 50 of respective first and second longitudinal members 40, 42. An alternative embodiment attachment strut 244' having a notch formed therein is shown in FIGS. 5 and 9. Coupling device 230 is lowered and raised to couple and uncouple to bedframe 10 as shown in FIGS. 6 and 8 and as will be discussed in greater detail below.

Propulsion device 226 includes a motor (not shown), a motor controller (not shown), and a pair of drive wheels 254 coupled to frame 228 and the motor that provides the force and energy necessary to move bed 10 about the care facility. Propulsion system 224 further includes a pair of secondary wheels 256 coupled to frame 228. According to alternative embodiments of the present disclosure, the motor controller may be a fixed controller coupled to the handle, a hand-held pendant having control knobs, buttons, or switches, a joy stick, or any other suitable controller for controlling the speed and/or direction of the motor.

Figure 10:
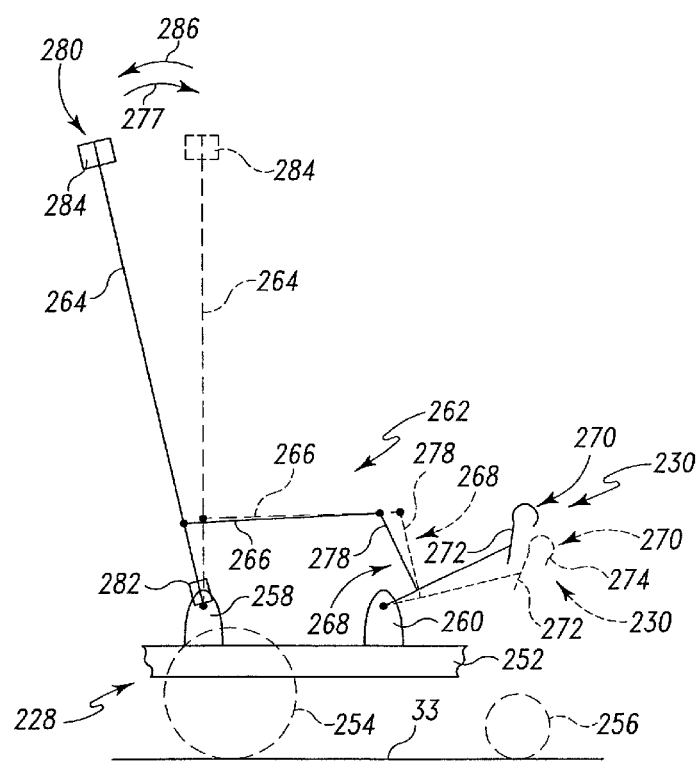
FIG. 10 is a diagrammatic view of the motorized propulsion system of FIG. 5 showing the motorized propulsion system including a linkage system coordinating movement of the hook between the raised position (shown in solid lines) and the lowered position (shown in phantom lines)

As shown in FIG. 8 and diagrammatically in FIG. 10, frame 228 of propulsion system 224 includes a housing 250, a frame member 252 coupled to housing 250, and a pair of brackets 258, 260 coupled to frame member 252. Propulsion system 224 further includes a linkage system 262 (shown diagrammatically in FIG. 10) including a handle 264 pivotably coupled to bracket 258, a first link 266 pivotably coupled to handle 264, and a second link 268 pivotably coupled to bracket 260 and first link 266. According to other alternative embodiments, links having different dimensions are used so that the distance and direction of travel of the coupling devices are different for specific applications and geometries for the respective alternative embodiments. Furthermore, according to other alternative embodiments, more links are used to obtain different distances and directions of travel of the coupling devices for specific applications and geometries for the respective alternative embodiments.

Coupling device 230 includes a pair of hooks 270 configured to couple to attachment strut 244, 244' as shown in FIGS. 5, 8, and 9. Pair of hooks 270 are coupled to second link 268 as shown in FIG. 10. Pair of hooks 270 include a flat portion 272 welded or otherwise coupled to second link 268 and a curved portion 274 coupled to flat portion 272 that is configured to hook over attachment strut 244, 244'. According to alternative embodiments, other coupling devices are used such as ball and socket arrangements, hitch pins, latches, and other coupling devices known to those of ordinary skill in the art.

When propulsion system 224 is not coupled to bed 10, propulsion system 224 is moved about a care facility from one bed to another by rolling on drive wheels 254 and secondary wheels 256 when handle 264 is moved to a tilted position. When a caregiver desires to move bed 10 between positions in a care facility, propulsion system 224 is coupled to bed 10. To couple propulsion system 224 to bed 10, propulsion system 224 is positioned in front of the foot end of bed 10 as shown in FIG. 5. While handle 264 is in the tilted position, propulsion system 224 is rolled in direction 76 toward the foot end of bed 10 so that flat portions 272 of pair of hooks 270 contact attachment strut 244, 244'. Next, handle 264 is pushed forward in direction 277 to a substantially vertical position as shown in FIGS. 5 and 10.

During rotation of handle 264, hooks 270 drop from a raised position, as shown in FIG. 6, to a lowered position, as shown in FIGS. 7 and 8, to secure attachment strut 244, 244' in curved portion 274 of hooks 270. The movement of hooks 270 is coordinated with the movement of handle 264 through first and second links 266, 268. As handle 264 is rotated forward, first link 266 pushing a first leg 278 of second link 268 forward causing second link 268 to rotate in a clockwise direction. Because hooks 270 are coupled to a distal end of second link 268, they also rotate in a clockwise direction and move downwardly relative to floor 33. This downward movement positions hooks 270 over strut 244, 244' of bedframe 10 to couple propulsion system 224 to bed 10.

As shown in FIG. 10, propulsion system 224 further includes a latch system 280 configured to secure handle 264 in the substantially vertical position. Latch system 280 includes a latch 282 coupled to frame 228 that secures handle 264 in the substantially vertical position so that handle 264 cannot be moved to the titled position unless latch 282 is released. According to the presently preferred embodiment of the present invention, the latch is a spring-biased pin (not shown) that engages a hole or recess (not shown) formed in handle 264. According to alternative embodiments of the present invention, other types of latches such as sliding bolts, hooks, ball detents, and other latch configurations known to those of ordinary skill in the art are used.

Latch system 280 further includes a release 284 coupled to handle 264 and to latch 282 by a cable (not shown). To release latch 282, release 284 is moved to an unlatched position so that the pin of latch 282 disengages handle 264 to permit handle 264 to be moved to the titled position. According to alternative embodiments, a button, lever, switch, or any other configuration of release known to those of ordinary skill in the art is used for the release. Furthermore, according to alternative embodiments, other releases coupled to other components of the propulsion system are used such as foot pedals, levers, buttons, or any other release mechanism known to those of ordinary skill in the art.

To remove propulsion system 224 from bed 10, handle 264 is moved in direction 286 away from headboard 218 to the tilted position after release 284 unlatches latch 282. First and second links 266, 268 cause hooks 270 to raise as a result of the movement of handle 264 in direction 286 so that propulsion system 224 is no longer coupled to bedframe 12 of bed 10. Then, propulsion system 224 is pulled in direction 288 away from bed 10 as shown in FIG. 5. Propulsion device 224 can then be moved to another bed that needs to be moved or propulsion device 224 may be placed in storage.

According to the present disclosure, propulsion system 224 is used with a variety of bedframe configurations. An attachment strut for each of said bedframe configurations is provided onto which hooks 270 may be coupled. Each of said attachment struts is coupled to the base frame or other component of the bed in a position so that propulsion system 224 is aligned in such a position hooks 270 are aligned to couple over the attachment strut of the respective bed. Thus, propulsion system 224 is configured to be used with any number of bedframe configurations so that propulsion system 224 is a universal device for use with many different beds.

Figure 11:
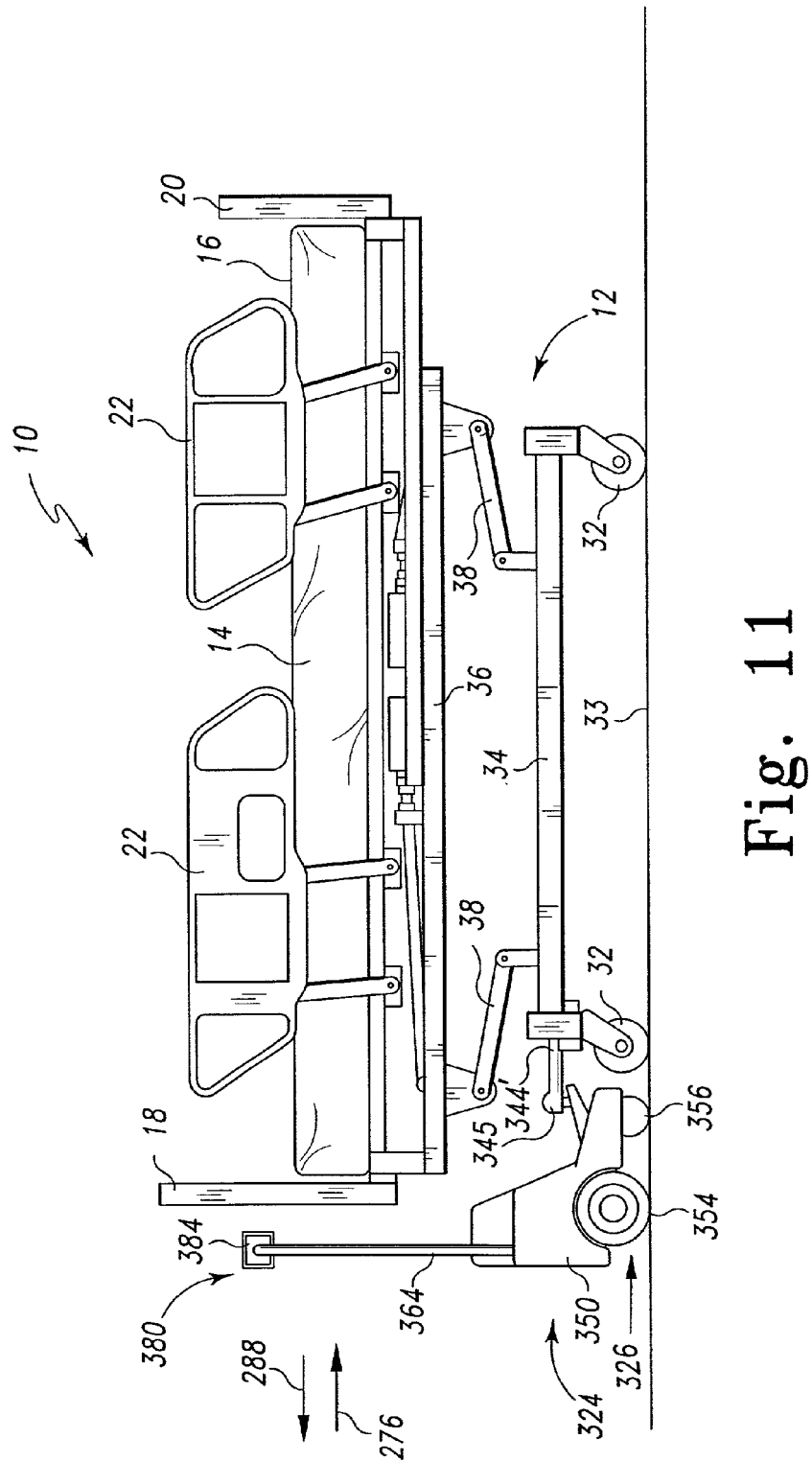
FIG. 11 is a side elevation view of the preferred embodiment bed and another embodiment motorized propulsion system coupled to the bed.
Figure 15:
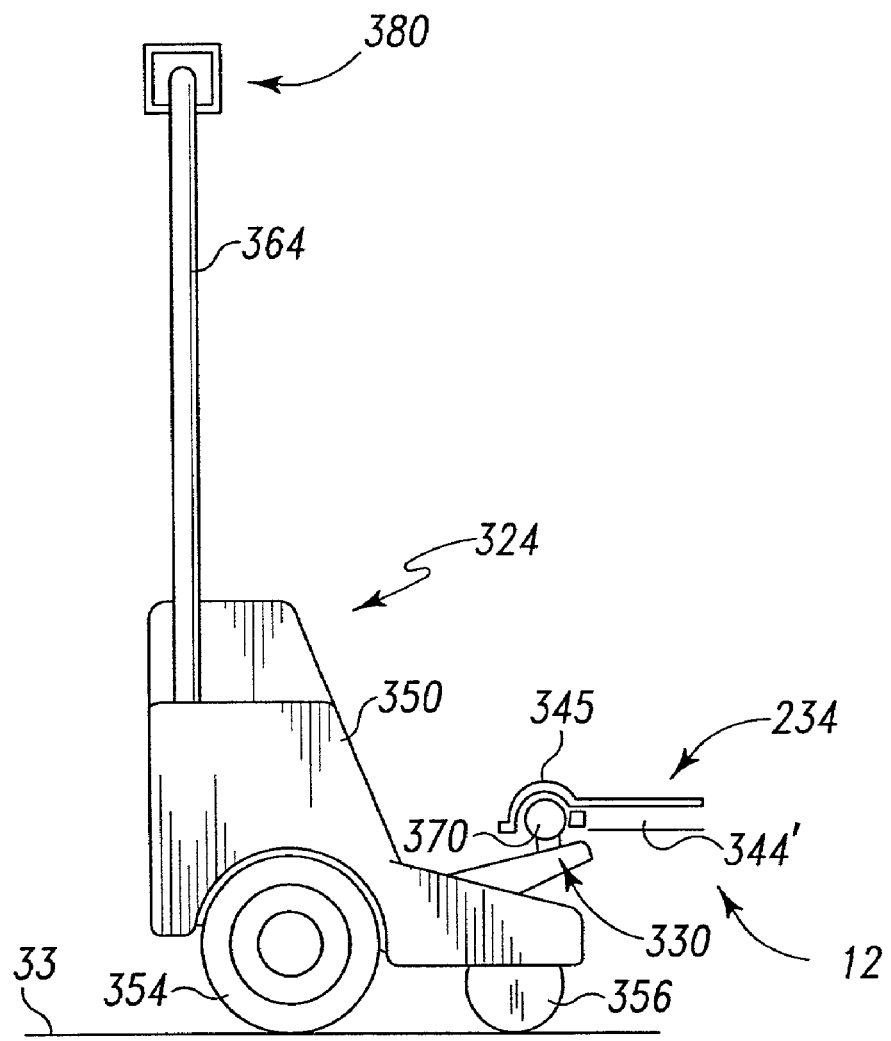
FIG. 15 is a view similar to FIG. 11, with portion of the bed broken away, showing the ball moved to the raised position in the socket of the bedframe.

Another alternative embodiment motorized propulsion system 324 is provided that couples to bedframe 10, as shown in FIGS. 11, 14, and 15. Propulsion system 324 is provided to assist a caregiver in moving bed 10 between various rooms or locations in a care facility. Propulsion system 324 includes a propulsion device 326, a frame 328, and a coupling device 330 configured to couple the remainder of propulsion system 324 to bedframe 10 so that a caregiver can couple and uncouple propulsion system 324 to bed 10. When it is desirable to move bed 10 a substantial distance, propulsion system 324 is coupled to bed 10 to power bed 10 so that a caregiver does not need to provide all the force and energy necessary to move bed 10 between positions in the care facility.

As shown in FIG. 14, base frame 34 includes an alternative embodiment strut 344 extending between ends 48, 50 of respective first and second longitudinal members 40, 42. Another alternative embodiment strut 344' is shown in FIGS. 11 and 15 that is coupled to first and second longitudinal members 40, 42 that extends outwardly. As shown in FIGS. 14 and 15, attachment struts 344, 344' each include a downwardly opening socket 345 coupled thereto.

Propulsion device 326 includes a motor (not shown), a motor controller (not shown), and a pair of drive wheels 354 coupled to frame 328 and the motor that provides the force and energy necessary to move bed 10 about the care facility. Propulsion system 324 further includes a pair of secondary wheels 356 coupled to frame 328. According to alternative embodiments of the present disclosure, the motor controller may be a fixed controller coupled to the handle, a hand-held pendant having control knobs, buttons, or switches, a joy stick, or any other suitable controller for controlling the speed and/or direction of the motor.

Figure 16:
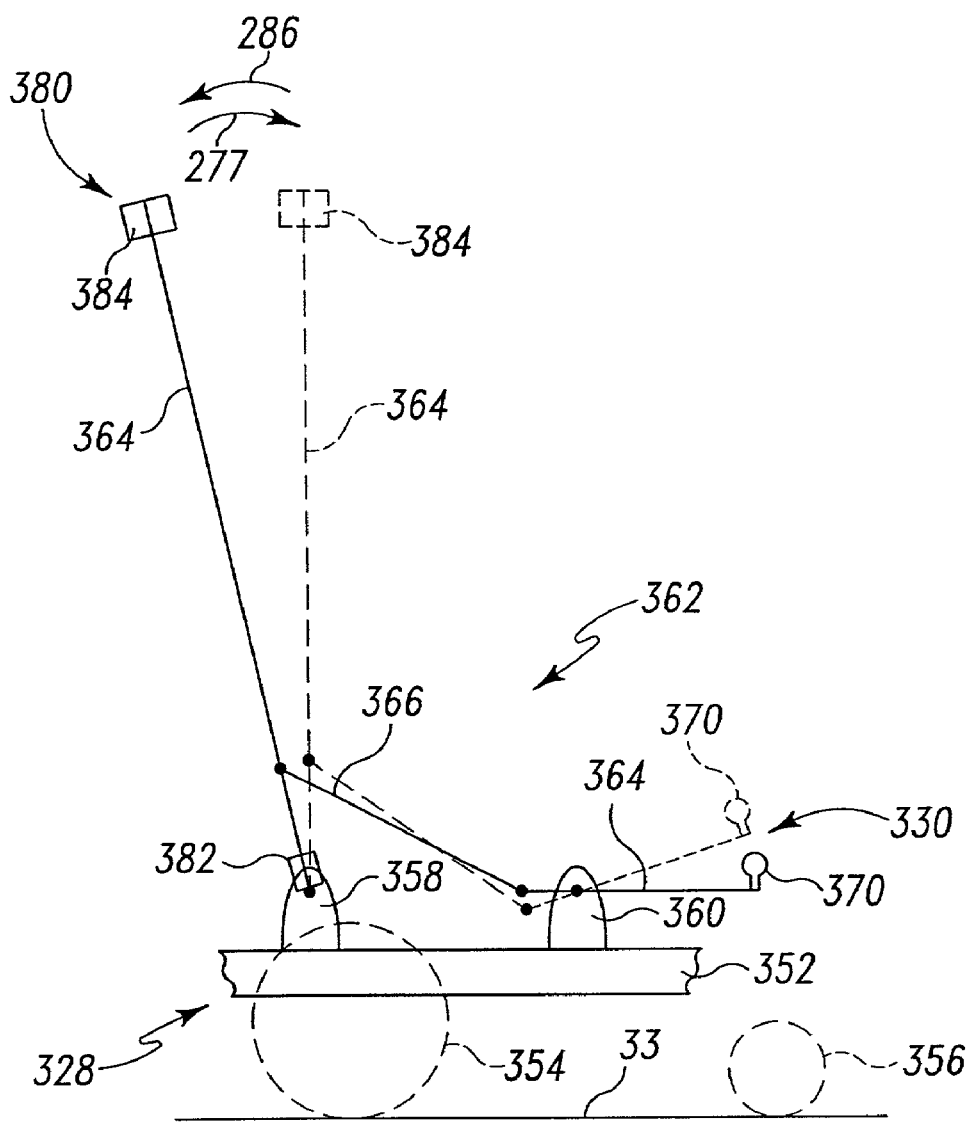
FIG. 16 is a diagrammatic view of the motorized propulsion system of FIG. 11 showing the motorized propulsion system including a linkage system providing movement of the ball between the lowered position (shown in solid lines) and the raised position (shown in phantom lines).

As shown in FIG. 14 and diagrammatically in FIG. 16, frame 328 of propulsion system 324 includes a housing 350, a frame member 352 coupled to housing 350, and a pair of brackets 358, 360 coupled to frame member 352. Propulsion system 324 further includes a linkage system 362 (shown diagrammatically in FIG. 16) including a handle 364 pivotably coupled to bracket 358, a first link 366 pivotably coupled to handle 364, and a second link 368 pivotably coupled to bracket 360 and first link 366. According to other alternative embodiments, links having different dimensions are used so that the distance and direction of travel of the coupling devices are different for specific applications and geometries for the respective alternative embodiment. Furthermore, according to other alternative embodiments, more links are used to obtain different distances and directions of travel of the coupling devices for specific applications and geometries for the respective alternative embodiments.

Coupling device 330 includes a ball 370 configured to be received in socket 345 of attachment strut 344, 344' as shown in FIGS. 11, 14, and 15. Ball 370 is coupled to second link 368 as shown in FIG. 16. According to alternative embodiments, the ball is coupled to the attachment strut and the socket is a component on the propulsion device. According to alternative embodiments, other coupling devices are used such as hooks, hitch pins, latches, and other coupling device known to those of ordinary skill in the art.

When propulsion system 324 is not coupled to bed 10, propulsion system 324 is moved about a care facility from one bed to another by rolling on drive wheels 354 and secondary wheels 356 when handle 364 is moved to a tilted position. When a caregiver desires to move bed 10 between positions in a care facility, propulsion system 324 is coupled to bed 10. To couple propulsion system 324 to bed 10, propulsion system 324 is positioned in front of the foot end of bed 10 as shown in FIG. 11. While handle 364 is in the tilted position, propulsion system 324 is rolled in direction 276 toward the foot end of bed 10 so that ball 370 is positioned under socket 345. Next, handle 364 is pushed forward in direction 277 to a substantially vertical position as shown in FIGS. 11 and 16.

During rotation of handle 364, ball 370 raises from a lowered position, as shown in FIG. 12, to a raised position, as shown in FIG. 13, to position ball 370 in socket 345 of attachment strut 344, 344' as shown in FIGS. 14 and 15. The movement of ball 370 is coordinated with the movement of handle 364 through first and second links 366, 368. As handle 364 is rotated forward, first link 366 pushing on second link 368 causing it to rotate in a counterclockwise direction. Because ball 370 is coupled to a distal end of second link 368, it also rotates in a counterclockwise direction and moves upwardly relative to floor 33. This upward movement positions ball 370 in socket 345 of strut 344, 344' of bedframe 10 to couple propulsion system 324 to bed 10.

Because of the ball and socket arrangement provided by ball 370 and socket 345, bed 10 and propulsion system 324 are pivotably coupled. This coupling permits propulsion system 324 and bed 10 to pivot relative to one another when turning corners so that propulsion system 324 does not "shimmy" when turning. Furthermore, propulsion system 324 can move the foot end of bed 10 in transverse and longitudinal directions and directions therebetween depending on the relative position of propulsion system 324 relative to bed 10. In particular, because strut 344' extends away from bedframe 10, more clearance exists between bedframe 10 and propulsion system 324. This permits propulsion system 324 to pivot a greater angle relative to bedframe 10 so that propulsion system 324 can push the foot end of bed 10 at angles perpendicular to the longitudinal axis of bed 10.

As shown in FIG. 16, propulsion system 324 further includes a latch system 380 configured to secure handle 364 in the substantially vertical position. Latch system 380 includes a latch 382 coupled to frame 328 that secures handle 364 in the substantially vertical position so that handle 364 cannot be moved to the titled position unless latch 382 is released. According to the presently preferred embodiment of the present invention, the latch is a spring-biased pin (not shown) that engages a hole or recess (not shown) formed in handle 364. According to alternative embodiments of the present invention, other types of latches such as sliding bolts, hooks, ball detents, and other latch configurations known to those of ordinary skill in the art are used.

Latch system 380 further includes a release 384 coupled to handle 364 and to latch 382 by a cable (not shown). To release latch 382, release 384 is moved to an unlatched position so that the pin of latch 382 disengages handle 364 to permit handle 364 to be moved to the titled position. According to alternative embodiments, a button, lever, switch, or any other configuration of release known to those of ordinary skill in the art is used for the release. Furthermore, according to alternative embodiments, other releases coupled to other components of the propulsion system are used such as foot pedals, levers, buttons, or any other release mechanism known to those of ordinary skill in the art.

To remove propulsion system 324 from bed 10, handle 364 is moved in direction 286 away from headboard 218 to the tilted position after release 384 unlatches latch 382. First and second links 366, 368 cause ball 370 to lower as a result of the movement of handle 364 in direction 386 so that propulsion system 324 is no longer coupled to bedframe 12 of bed 10. Then, propulsion system 324 is pulled in direction 288 away from bed 10 as shown in FIG. 11. Propulsion device 324 can then be moved to another bed that needs to be moved or propulsion device 324 may be placed in storage.

According to the present disclosure, propulsion system 324 is used with a variety of bedframe configurations. An attachment strut with a socket for each of said bedframe configurations is provided into which ball 370 may be positioned. Each of said attachment struts is coupled to the base frame or other component of the bed in a position so that propulsion system 324 is aligned in such a position that ball 370 is aligned to fit within the socket. Thus, propulsion system 324 is configured to be used with any number of bedframe configurations so that propulsion system 324 is a universal device for use with many different beds.

According to alternative embodiments of the present disclosure, an appropriate attachment strut 244, 244', 344, 344' is coupled to the foot end of bedframe 10. Thus, each propulsion system 224, 324 can also be coupled to the foot end of bedframe 10.

The invention claimed is:

1. A propulsion system configured to move a patient support, the propulsion system comprising
    a propulsion device adapted to contact the floor to power movement of the patient support
    a coupler configured to detachably couple the propulsion device to the patient support, the coupler including a first member adapted to couple the patient support at a first distance from the floor and a second member adapted to couple the patient support at a second distance from the floor that is greater than the first distance, and
    a vertically extending handle, wherein the propulsion device includes a frame and a motorized wheel coupled to the frame, and the vertically extending handle is coupled to the frame, and wherein the second member is slidably coupled to the vertically extending handle.

2. The propulsion system of claim 1, wherein the second member is adapted to couple to a patient restraint board of the patient support and the first member is adapted to couple to a base frame of the patient support.

3. The propulsion system of claim 1, wherein the first member is hook-shaped and adapted to hook onto a bedframe of the patient support.

4. The propulsion system of claim 3, wherein the second member is hook-shaped and adapted to hook onto a patient restraint board of the patient support.

5. The propulsion system of claim 1, wherein the vertically extending handle extends from the frame of the propulsion device to a height above the patient restraint board.

6. A method of coupling a propulsion system to a patient support, the patient support including a bedframe and a patient restraint board having a perimetrical portion, the bedframe being configured to be raised and lowered resulting in the patient restraint board being positioned in multiple positions including a raised position and a lowered position, the method comprising the steps of:
    providing a propulsion system including a propulsion device to power movement of the propulsion system and a coupler configured to couple to the patient restraint board of the patient support;
    positioning the coupler proximate to the perimetrical portion of the patient restraint board; and
    providing relative movement between the coupler and the patient restraint board such that the coupler and the perimetrical portion of the patient restraint board are coupled.

7. The method of claim 6, wherein the propulsion device includes a frame and a handle and the coupler is moveably coupled to the handle.

* * * * *